United States Patent von Wedel et al.

[11] Patent Number: 5,366,711
[45] Date of Patent: Nov. 22, 1994

[54] PROCESS FOR THE OXIDATIVE PURIFICATION OF WASTE GASES CONTAINING NITROGEN OXIDES

[75] Inventors: Wegido von Wedel, Paris, France; Ernst-Robert Barenschee, Hanau; Hubertus Eickhoff, Alzenau, both of Germany

[73] Assignee: Degussa Aktiengesellschaft, Frankfurt am Main, Germany

[21] Appl. No.: 968,067

[22] Filed: Oct. 30, 1992

[30] Foreign Application Priority Data

Nov. 2, 1991 [DE] Germany .............. 4136183

[51] Int. Cl.$^5$ .............................. C01B 21/38
[52] U.S. Cl. .................. 423/239.1; 423/239.2; 423/393; 423/394
[58] Field of Search .............. 423/239, 239 A, 239 Y, 423/235, 235 D, 239.1, 239.2, 393, 394

[56] References Cited

U.S. PATENT DOCUMENTS

| | | |
|---|---|---|
| 4,341,747 | 7/1982 | Downey . |
| 4,367,204 | 1/1983 | Klopp et al. . |
| 4,425,313 | 1/1984 | Cooper .................. 423/235 |
| 5,112,587 | 5/1992 | von Wedel et al. . |

FOREIGN PATENT DOCUMENTS

| | | |
|---|---|---|
| 2537061 | 3/1976 | Germany . |
| 2813370 | 10/1978 | Germany . |
| 673409 | 3/1990 | Germany . |

Primary Examiner—Wayne Langel
Attorney, Agent, or Firm—Beveridge, DeGrandi, Weilacher & Young

[57] ABSTRACT

A process is described for the removal of nitrogen oxides from waste gases with the recovery of nitric acid or a nitrate solution. The waste gas is reacted with hydrogen peroxide in an amount appropriate to the desired degree of removal of nitrogen oxides, on a catalyst, at a temperature of less than 800° C., preferably in the range of 20° to 100° C., to give the valuable product, nitric acid or a nitrate solution. This may be done in accordance with the invention by bringing the hydrogen peroxide as a solution, i.e., in the liquid phase, into contact with the catalyst through which the waste gas is flowing. The reaction product is either utilized in a gaseous form or processed to nitric acid or a nitrate solution. Alternatively, the hydrogen peroxide may be introduced in a gaseous form, using a honeycombed catalyst, and wherein the hydrogen peroxide is present in at least one half of the stoichiometrically determined amount. Regardless of whether the hydrogen peroxide is introduced in a liquid or vapor form, the resulting nitric acid solution may be scrubbed, preferably with a nitrate salt solution, to provide the concentrated product.

20 Claims, 2 Drawing Sheets

PROCESS FOR THE OXIDATIVE PURIFICATION OF WASTE GASES CONTAINING NITROGEN OXIDES

BACKGROUND OF THE INVENTION

The present invention relates to an improvement process disclosed in German patent 40 15 284 (patent application P 40 15 284.7-43), This German application relates to U.S. Pat. No. 5,112,587, which application and U.S. patent are entirely incorporated herein by reference.

BRIEF DESCRIPTION OF THE INVENTION

Generally, the invention relates to a process for the oxidative purification of waste gases containing nitrogen oxides, especially NO and/or $NO_2$, and in particular, to the purification of process gases and waste gases from industrial plants and furnaces, as well as from household refuse and special refuse incineration plants. In the process, the content of nitrogen oxides in the waste gas is determined, the waste gas is reacted with hydrogen peroxide in an amount appropriate to the amount of nitrogen oxides to be removed and equal to at least half the stoichiometric amount needed to satisfy equations (I) and (II):

$$2NO + 3H_2O_2 \rightarrow 2HNO_3 + 2H_2O \qquad (I)$$

and/or $$2NO_2 + H_2O_2 \rightarrow 2HNO_3 \qquad (II)$$

The reaction takes place on a catalyst, wherein the catalyst is adsorbent toward $H_2O_2$ and/or NO and/or $NO_2$ on the basis of an increased external surface area and/or on the basis of the available internal surface area. The catalyst does not excessively decompose $H_2O_2$, if at all, and it may be a solid catalyst, a honeycombed catalyst or the like. The reacted waste gas is withdrawn for further processing or the proportion of gaseous $HNO_3/H_2O$ mixture contained therein is further processed to nitric acid or a nitrate solution.

In the above-mentioned U.S. patent, it was required that the hydrogen peroxide solution used in the basic process be converted to a gaseous state before being brought into contact with the catalyst. Preferably, in that process, the waste gas containing nitrogen oxides, charged with an appropriate amount of the $H_2O_2$ vapor, is reacted at a temperature in the range of 20°–120° C.

In one embodiment of the present invention, the process is carried out with unvaporized hydrogen peroxide solution (i.e., a liquid solution). Preferably, the hydrogen peroxide solution has a hydrogen peroxide content of up to 85% by weight. This process includes the oxidative purification of waste gases containing nitrogen oxides by first determining the content of nitrogen oxides in the waste gas. The waste gas is then reacted with hydrogen peroxide in an amount appropriate to the content of nitrogen oxides to be removed and equal to at least half of a stoichiometrically sufficient amount needed to satisfy the reaction equations:

$$2NO + 3H_2O_2 \rightarrow 2HNO_3 + 2H_2O \qquad (I)$$

and/or $$2NO_2 + H_2O_2 \rightarrow 2HNO_3, \qquad (II).$$

In this embodiment of the invention, the reactions take place on a catalyst which is adsorbent toward $H_2O_2$, NO, or $NO_2$, wherein the catalyst does not excessively decompose $H_2O_2$. At least a portion of time reacted waste gas containing a gaseous $HNO_3/H_2O$ mixture is withdrawn for further processing to nitric acid or to a nitrate solution. The reaction step is carried out at a temperature below 180° C., and preferably, the temperature is in time range of 20° to 100° C.

Additionally, in this embodiment of the invention, time reaction may be carried out in a shaken bed, a fixed shaking bed, a filter candle, a whirl bed or on a honeycomb catalyst. The hydrogen peroxide solution may be introduced into the waste gas stream by spraying or atomizing to thereby form a mixture. This mixture is then applied onto the catalyst. Alternatively, the hydrogen peroxide solution may be applied to the catalyst by directly pouring, by adding hydrogen peroxide dropwise or by spraying hydrogen peroxide solution onto the catalyst.

When time hydrogen peroxide is initially introduced in this embodiment of the invention, the catalyst may be either in a dry state or under condensation from water contained in the waste gas. In this process, the catalyst may be present in the reactor in three separate trays. Optionally, each tray may contain a different catalyst composition. Alternatively, the catalyst may be present in the reactor on two different trays, optionally, containing different catalysts, or on a single tray.

In another embodiment of the invention, the hydrogen peroxide can be contacted with the catalyst in a vaporous form. In this second embodiment of the invention, the process for the oxidative purification of waste gases containing nitrogen oxides includes determining the content of nitrogen oxides in the waste gas. The waste gas is reacted with hydrogen peroxide in an amount appropriate to the content of nitrogen oxides to be removed and equal to at least half of a stoichiometrically sufficient amount needed to satisfy the reaction equations:

$$2NO + 3H_2O_2 \rightarrow 2HNO_3 + 2H_2O \qquad (I)$$

and/or $$2NO_2 + H_2O_2 \rightarrow 2HNO_3, \qquad (II).$$

Advantageously, between one half the stoichiometric amount and less than the stoichiometric amount of hydrogen peroxide is used.

The reactions take place on a honeycombed catalyst which is adsorbent toward $H_2O_2$, NO, or $NO_2$, wherein the catalyst does not excessively decompose $H_2O_2$. The use of a honeycombed catalyst has the added advantage that there is a lower pressure drop than when a solid catalyst is used. After reaction, at least a portion of the reacted waste gas containing a gaseous $HNO_3/H_2O$ mixture is withdrawn for further processing to nitric acid or to a nitrate solution. The reaction step is carried out at a temperature below 180° C., and preferably, the temperature is in the range of 20° to 100° C.

In this embodiment of the invention, when the hydrogen peroxide is initially introduced, the catalyst is either in a dry state or under condensation from water contained in the waste gas.

Regardless of whether the hydrogen peroxide contacts the catalyst in liquid or vapor form, another aspect of this invention relates to the condensation or scrubbing step (i.e., the washing step). In this step, the $HNO_3$ is removed from the waste gas by absorption or condensation. The waste gas may be reacted again by contacting it with the catalyst for a further reduction of any nitrogen oxides still present. Optionally, additional $H_2O_2$ may be added, if necessary. Concentrated nitric acid or nitrate solution is drawn off as the product.

The scrubbing solution or liquor is selected from the group of: water, dilute nitric acid, an alkali metal nitrate solution or an alkaline earth metal nitrate solution. Preferably, a nitrate salt is used as the scrubbing solution, wherein the nitrate salt solution is an alkali metal nitrate solution or an alkaline earth metal nitrate solution. Even more preferably, the nitrate salt solution is sodium nitrate, although calcium nitrate and magnesium nitrate also may be used. By using the nitrate salt solution in the washing step, the vapor pressure of the nitric acid over the washing medium is kept very low. Thus, a single washing station (i.e., a single stage) may be used. Additionally, more nitric acid can be adsorbed per volume of the nitrate salt washing medium than by washing with dilute nitric acid. These advantages result in quicker washing processes, cost savings in providing the washing medium, and environmental advantages because there is less waste material for disposal.

In the scrubbing step, the nitric acid is present in the gaseous state. The scrubbing solution may be recycled for concentrating the nitric acid or the nitrate content. Optionally, an alkali metal hydroxide or an alkaline earth metal hydroxide solution is added.

In both the liquid hydrogen peroxide embodiment and the vapor hydrogen peroxide embodiment, the amount of hydrogen peroxide solution to be used may be determined using a regulating system. This amount is determined based on the nitrogen oxide concentration in the crude gas, the nitrogen oxide content of the reacted waste gas, or both nitrogen oxide contents, or the difference between the nitrogen oxide content in the crude gas and the waste gas.

In the process in accordance with the invention, it is preferable that the catalyst does not decompose hydrogen peroxide at all. In any event, the catalyst should not excessively decompose hydrogen peroxide. Suitable catalyst compositions which do not excessively decompose hydrogen peroxide can be determined easily by one skilled in the art by routine and conventional experimentation.

BRIEF DESCRIPTION OF THE DRAWINGS

The invention will be described in more detail in the following detailed description, in conjunction with the attached drawings, wherein.

DETAILED DESCRIPTION OF THE INVENTION

Figure 1:
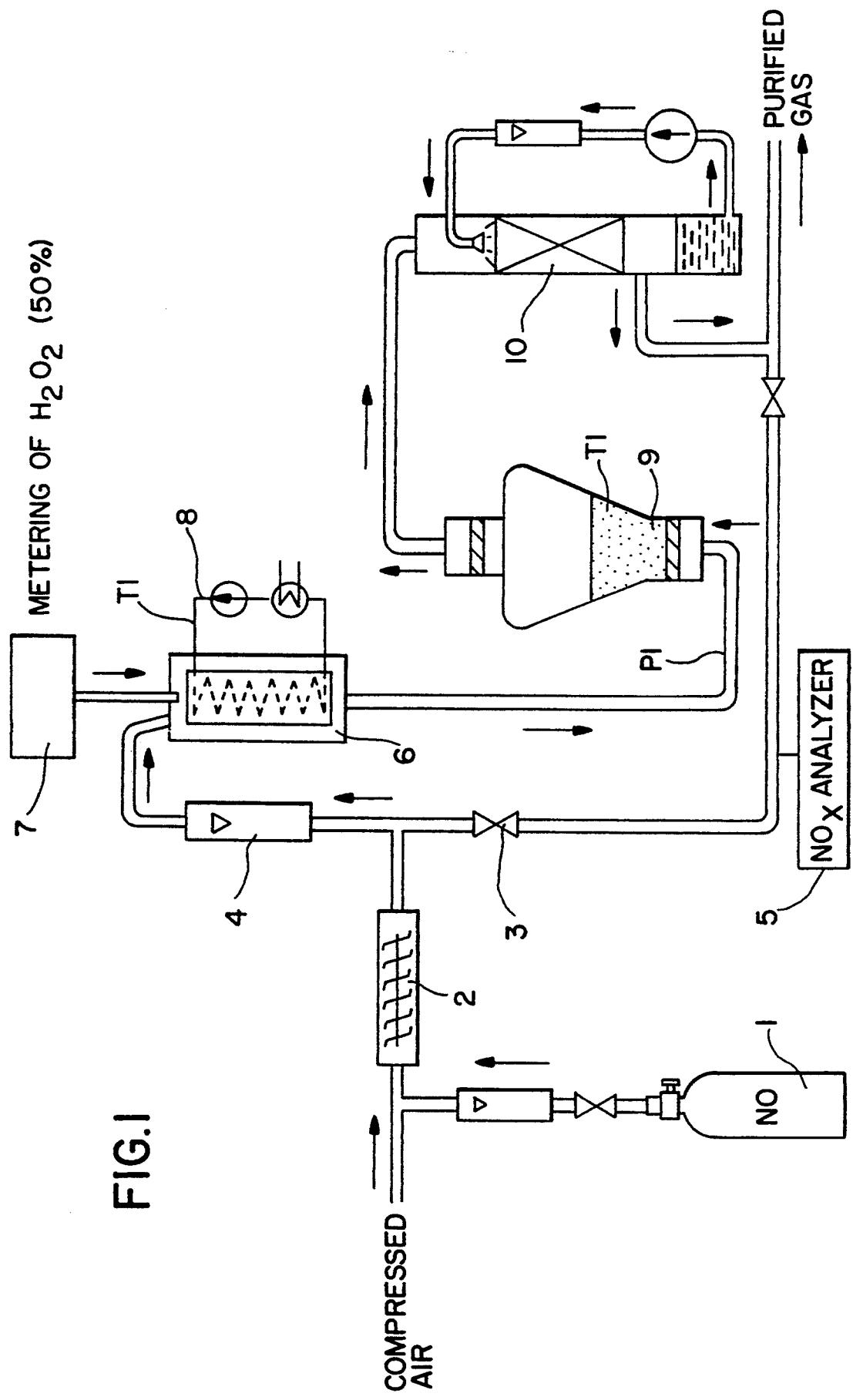
FIG. 1 is a flow diagram illustrating one method for carrying out time process in accordance with the invention.

In the process in accordance with one embodiment of the invention, the reaction is carried out at temperatures below 180° C. preferably in the range of 20° to 100° C., wherein the hydrogen peroxide is brought into contact with the catalyst as a solution, in portions or continuously.

In the treatment of moist gases in accordance with the invention, it may be necessary, in order to prevent condensation in the reactor, to heat the gas to be treated before it enters the reactor or to keep the entire reactor at a temperature above the dew point of time most readily condensing constituent of the reaction mixture.

On the other hand, waste gases which may be at a temperature below 20° C. can also be freed from nitrogen oxides by means of the process according to the invention. The temperature of the waste gases can be 0° C. or even lower. Lower temperatures generally favor the adsorption capacity of the catalyst for the reactants. Furthermore, the conversion of the nitrogen oxides to nitric acid, $HNO_3$, is exothermic and, accordingly, this conversion reaction is thermodynamically favored at a lower temperatures.

However, the catalyst efficiency cannot generally be expected to improve uniformly with decreasing temperature, because the reaction product, $HNO_3$, is also adsorbed better at lower temperatures. Hence, the product can increasingly cover the surface of the catalyst.

The indication of an upper temperature of 180° C. does not define an absolute upper limit. However, as time efficacy of removal of nitrogen oxides worsens with increasing temperature and is accompanied by an increase in thermal decomposition of the hydrogen peroxide, the application of the process above 180° C. does not appear to be economically feasible.

The determination of the amount of hydrogen peroxide required for the removal of nitrogen oxides can be affected by measuring the concentration of the nitrogen oxides contained in the waste gas to be treated, taking into account equations (I) and (II) above.

The $H_2O_2$ flow also depends on the particular desired degree of removal of nitrogen oxides, it being possible to consider degrees of removal down to half the stoichiometric amount which can be calculated from equations (I) and (II). Larger amounts of $H_2O_2$, which can even exceed the stoichiometric requirement indicated by the equations, can be used, if necessary, and are allowed for.

The reaction can be carried out in a packed bed, a filter candle, a fluidized bed or with a honeycombed catalyst.

The following substances in finely divided, granulated or tablet form, or shaped into any desired shape, including honeycomb structures, or applied to supports of honeycomb structure, can be used as catalysts, either by themselves or in a mixture:

- silica gels, precipitated silica, pyrogenic silica, if appropriate, in a form which has been rendered hydrophobic;
- natural or synthetic zeolites of large or medium pore size;
- ion exchanger resins of porous structure;
- phyllosilicates;
- aluminum oxide;
- diatomaceous earth;
- titanium dioxide;
- natural or synthetic sheet silicates; and
- activated charcoal.

These same catalysts may be used whether the hydrogen peroxide is contacted with the catalyst in liquid or vapor form.

Specific examples of the catalyst for both the liquid and vapor hydrogen peroxide embodiments are described in greater detail below. All of these substances make outstanding catalysts:

Aerosil 200 (pyrogenic amorphous silica), 6×5.5 mm tablets (a development product from the commercial product Aerosil 200, from Degussa AG, Frankfurt, Germany);

Aerosil 380 (pyrogenic amorphous silica), 3×3 mm tablets (a development product from the commercial product Aerosil 380, from Degussa AG, Frankfurt, Germany);

Sipernat 50 (precipitated silica), 7×6 mm extrudates (a development product from the commercial product Sipernat 50, from Degussa AG, Frankfurt, Germany);

FK 700 (precipitated silica), 7×6 mm extrudates (a development product from the commercial product FK 700, from Degussa AG, Frankfurt, Germany);

Silica gel 60, having a particle size in the range of 0.2–0.5 mm, and a specific surface area of approximately 450–500 $m^2/g$ (item 7733 from Merck, Darmstadt);

Silica gel 60 H, silanized (item 7761 from Merck, Darmstadt);

Large-pore, 12-ring zeolite, mordenite (pore size 6.7×7.0 A, modulus 18 (Si/Al Ratio of 9));

Large-pore, 12-ring zeolite, dealuminized y-zeolite (pore size 7.4 A, modulus 200 (Si/Al ratio of 100));

Large-pore, 12-ring zeolite, $NH_4$-y-zeolite (pore size 7.4 A, modulus 5 (Si/Al ratio of 2.5));

Medium-pore, 10-ring zeolite, ZSM-5 (pore size 5.4–5.6 A, modulus 42 (Si/Al ratio of 21));

Ion exchanger resin, macroporous, strongly acidic (Amberlyst 15, item 15635 from Merck, Darmstadt);

Commercially available, calcined diatomaceous earth;

Aluminum oxide 90 (item 1078 from Merck, Darmstadt);

Titanium dioxide (item 812 from Merck, Darmstadt);

Calcium silicate hydrate, contained in CATSAN—cat litter from Effem, Verden/Aller; and Activated charcoal with a specific surface area of 1270 $m^2/g$ and an average pore size of 160 $\mu m$ (active charcoal support 120, Degussa AG, Frankfurt, Germany).

In one preferred embodiment of the process in accordance with the invention, the aqueous hydrogen peroxide is incorporated in a preferred concentration of up to 85% by weight into the waste gas stream, by spraying or atomizing the required amount, and feeding the mixture onto the catalyst. One can, however, obtain similarly good results by directly pouring, adding dropwise or spraying hydrogen peroxide, preferably in a concentration of up to 85% by weight, in the amount required on the catalyst.

According to the disclosure of U.S. Pat. No. 5,112,587, gasified hydrogen peroxide solution is contacted with the solid catalyst. In this patent, hydrogen peroxide is present in the finest distribution in the waste gas. It has been found, however, that such a fine distribution is not absolutely necessary, but can be replaced by a solution, either sprayed into the waste gas jet, or directly applied onto the catalyst. The dosing can also be carried omit by adding the hydrogen peroxide solution in a dropwise manner, or by applying a liquid jet onto the catalyst.

Thus, there is a possibility of treating the catalyst either in a dry stale or under condensation conditions of the reaction mixture with the reactant. Particularly if the solution is added dropwise directly onto the catalyst or by direct spraying, it is to be taken into consideration that not only a part of the catalyst is wetted by the hydrogen peroxide solution, but local overdosages may lead to swelling of the catalyst, while other parts of the catalyst are only incompletely contacted with the hydrogen peroxide solution. The result of the above phenomena is a reduced effectiveness of the catalyst, which is, however, reversible.

If the catalyst is added in a whirl (vortex) bed, the uniform distribution or time hydrogen peroxide solution on the particles of the catalyst can be efficiently achieved. As a result of the self-acting admixing movement in the catalyst bed, it is sufficient to add the hydrogen peroxide solution dropwise or in form of a liquid jet.

Occasionally, especially in time case of waste gases which are relatively moist and at the same time contain only small amounts of nitrogen oxides, e.g., in the case of waste gases from refuse incineration plants after flue gas scrubbing, it is recommended to condition the moist waste gas before it is brought into contact with the catalyst, so that the moisture contained in the flue gas does not condense out on the catalyst. The simplest form of conditioning is to heat the gas before or during its contact with the catalyst. Often, a temperature increase of only 10° C. is sufficient to prevent condensation.

Suitable alternative procedures for protecting the catalyst from deactivation by a liquid film, which are reversible per se, are to condense out part of the moisture beforehand by raising the pressure or cooling with subsequent reheating, or to operate the plant under reduced pressure. Another procedure for conditioning the gas includes diluting the gas to be treated, e.g., with external air. This generally lowers both the water dew point and the temperature (and the $NO_x$ concentration) in the gas feed.

All of these procedures improve the removal of nitrogen oxides, although the volume of gas to be treated increases if external air is added. It is not necessary in every case to condition the waste gas or to prevent moisture from condensing out on the catalyst. This is shown by a treatment for the removal of nitrogen oxides from air containing 7400 ppm of $NO_x$, at temperatures between 0° C. and 80° C., where the $NO_x$ concentration drops to 350 ppm of $NO_x$, wherein the catalysts used are extrudates (6×5.5 mm) of pyrogenic silica. The above-mentioned $NO_x$ conversion levels could be maintained in continuous operation over several days, even though the catalyst was completely perfused with the condensate that was produced. During the operation, the condensate drained out of the catalyst packing into a collecting vessel.

Further modifications of the invention relate to intermediate treatments or aftertreatments of the substances reacted on the catalysts. Such intermediate treatments and aftertreatments are conventional and well known to those skilled in the art.

Thus, the waste gas reacted on the catalyst, if appropriate after reduction or removal of the $HNO_3$ contained therein by absorption or condensation, can be reacted again catalytically according to the process of the invention, for further reduction of the nitrogen oxides still present. If appropriate, additional $H_2O_2$ may be added. This procedure can be repeated one or more times, as required.

A particularly advantageous procedure, which affords an almost complete separation of $HNO_3$ in a single stage, includes reducing the proportion of $HNO_3$ in the treated waste gas by condensation or by scrubbing with water, dilute nitric acid, an alkali metal nitrate solution, or an alkaline earth metal nitrate solution, in the gas phase, and withdrawing the gas which has passed through the scrubbing process, for further treatment, if appropriate. This washing step may take place whether the hydrogen peroxide is initially contacted with time catalyst in a liquid or vapor form. It has been found that the use of the nitrate salt solution is particularly advantageous in the washing step, particularly a sodium nitrate solution. By using the salt solution in the washing step, the vapor pressure of the nitric acid over the washing medium is kept very low. Thus, a single washing station (i.e., a single stage) may be used. Additionally, more nitric acid can be adsorbed per volume of the washing medium than by washing with dilute nitric acid. These advantages result in quicker washing times, cost savings in providing the washing medium, and environmental advantages because there is less waste material for disposal.

The scrubbing liquor can be recycled for concentrating of the nitric acid or the filtrate content, with the addition of alkali metal hydroxide or alkaline earth metal hydroxide solution, if necessary, and the concentrated nitric acid or nitrate solution can be drawn off as required.

Although one purpose of the process according to the invention is to recover utilizable nitric acid, it can occasionally be desirable to recover nitrate salt solutions instead of nitric acid from the nitrogen oxides converted to $HNO_3$. The recovery of these nitrate salts is also within the scope of this invention.

The maximum concentration of the nitric acid is influenced by the operating temperature of the scrubbing stage, the operating pressure and the content of $HNO_3$ and water in the treated waste gas.

There is generally a direct correlation between the $HNO_3$ content of the treated waste gas and the nitrogen oxide conversion. In the case of waste gases with a high $NO_x$ content, nitric acid of more than 60% by weight can be recovered directly, e.g., by condensation or end gas scrubbing. The acid concentration depends on the temperature, the pressure and the water content and $HNO_3$ content of the gas. If waste gases with a relatively low $NO_x$ content are treated, e.g., waste gases from refuse incineration plants, the resulting $HNO_3$ content is naturally quite low, even for a high $NO_x$ conversion. The nitric acid which can be recovered via gas scrubbing is approximately 20% by weight for waste gases containing approximately 200 ppm of $NO_x$ and at 60° C. This dilute acid can be concentrated by conventional processes known to those skilled in the art. Because of the vapor pressure of $HNO_3$, gas scrubbing is carried out in at least two stages, with separate scrubbing circuits for primary scrubbing and secondary scrubbing.

Instead of recovering very dilute nitric acid, it may be more advantageous, as mentioned previously, to neutralize the circulating scrubbing medium with basic salt-forming reagents, such as alkali metal hydroxide or alkaline earth metal hydroxide. This enables the $HNO_3$ vapor pressure over the scrubbing medium to be kept very low, with the advantage that outlet air scrubbing can be carried out in one stage. A further advantage is that more $HNO_3$ can be extracted from the gas phase per unit volume of scrubbing medium, thereby reducing the amount of liquid obtained. The nitrate solution can be depleted either by crystallization or by another method of salt separation, or it is evaporated in evaporators or in a spray dryer.

The feeding of alkali hydroxide solution into the scrubbing stage is controlled so that no undesirable simultaneous absorption of accompanying gases, such as carbon dioxide, takes place, which would result not only in increased alkali consumption, but also in contamination of the nitrate product.

In the case when carbon dioxide is present, control over the absorption of carbon dioxide can be achieved by adjusting the pH to values below 7. If no undesirable, absorptive accompanying gases are present in the waste gas other than $HNO_3$ and possible nitrogen oxide residues, the choice of pH is unrestricted.

It has proven particularly favorable to determine the amount of hydrogen peroxide solution via a regulating system which the nitrogen oxide concentration in the crude gas (which is the waste gas to be purified) and/or the purified gas, or the difference between the two values, is used as a control variable.

A particularly advantageous way of determining the amount of $H_2O_2$ is to use the $NO_x$ content of the already treated waste gas to regulate the metering of the $H_2O_2$. The advantage of this method is that the addition of hydrogen peroxide is governed by the result of the reaction, so the appearance of oxidizable accompanying substances which also react with hydrogen peroxide, such as $SO_2$, does not cause an $H_2O_2$ deficit with respect to the target reaction. On the other hand, the effect of other oxidation reactions, e.g., the oxidation of NO to $NO_2$ with atmospheric oxygen, is used to reduce the consumption of $H_2O_2$.

Irrespective of the composition of the crude waste gas, an advantage of using the difference between the inlet concentration and outlet concentration of $NO_x$ as a control variable for regulating the $H_2O_2$, is that it improves the detection of the processes in the reactor.

The invention is illustrated in greater detail below with the aid of the practical Examples which follow.
Introductory Remarks on the Examples The apparatus used in Examples 1 to 4 was essentially the same as that described in Example 1 of U.S. Pat. No. 5,112,587 and reproduced in FIG. 1. The description of the apparatus of FIG. 1 is the same as that used in connection with Example 1 of U.S. Pat. No. 5,112,587. Example 1 in U.S. Pat. No. 5,112,587 is included in the present patent application as "Comparative Example 1" included with the following "Examples of the Invention".

The experimental results in Examples 5 to 8 were obtained using a glass pilot-plant apparatus in which the reactor part had an internal diameter of 300 mm. This apparatus is shown diagrammatically in FIG. 2.

Comparative Example 1

A model gas is prepared by mixing compressed air with a small amount of NO gas taken from a gas cylinder 1, and is passed through a mixing section 2 into the falling-film evaporator 6 (material: glass). The volume flow rate is 2.3 $Nm^3/h$. The flow rate is indicated by a rotameter 4 (float flow meter). If necessary, the model gas is analyzed for its NO and $NO_x$ content with a commercially available $NO_x$ analyzer 5 (chemiluminescence principle) after the valve 3 has been opened. The difference between the $NO_x$ concentration and NO concentration gives the $NO_2$ concentration. The $NO_2$ is formed from NO by atmospheric oxidation.

As it flows through the falling-film evaporator 6, the model gas is charged with a defined amount of vaporized $H_2O_2$ solution. This is done using an automatic metering device 7, with which 50% aqueous hydrogen peroxide solution is introduced continuously onto the evaporating surface of the falling-film evaporator 6 over which the model gas is flowing. The evaporating surface is heated with warm water 8, which is maintained at a temperature of 80° C. by means of a thermostat. The $H_2O_2$ solution, which is metered in, runs at a metering rate of 0.08 ml/min onto the upper end of the evaporating surface and flows down the latter under gravity. On its way down, time $H_2O_2$ solution vaporizes completely and is taken up and entrained by the model gas.

The gas stream thus charged with $H_2O_2$ solution passes into the fluidized-bed reactor 9 (material: glass) containing the catalyst (60 g of silica gel, particle size 0.2–0.5 mm).

The reactor 9 is of cortical design. In the lower part where the cross-section is smallest, the empty-tube velocity of the gas is 0.33 m/s. The reactor 9 is equipped with a thermometer.

Downstream from the reactor 9, the reacted gas mixture is passed into a packed column 10 (material: glass; diameter: 4 cm; length: 40 cm; packing: 4×4 mm Raschog rings; co-current operation). Here the $HNO_3$ formed in the reactor 9 is absorbed at room temperature with recycled water, which is gradually converted to dilute $HNO_3$. Because of their poor solubility, only a negligible proportion of the unconverted fraction of nitrogen oxides goes into solution in the column 10. The recirculated liquid flow is 1.2 l/min. A partial stream of gas leaving the scrubbing column 10 is analyzed for its residual content of nitrogen oxides with the $NO_x$ analyzer 5.

Conditions:
Model gas: 480 ppm of NO and 680 ppm of $NO_x$ (200 ppm of $NO_2$) at 2.3 $Nm^3$/h;
Temperature in the reactor: 40° C.;
Total pressure: 1 bar.

The concentrations in the gas withdrawn from the column are as follows:
without addition of $H_2O_2$ solution in evaporator 6: 430 ppm of NO and 630 ppm of $NO_x$ (200 ppm of $NO_2$);
with addition of 0.08 ml/min of 50% $H_2O_2$ solution in evaporator 6: 0 ppm of NO and 30 ppm of $NO_x$ (30 ppm of $NO_2$).

These final concentrations are attained 10 minutes after time start of the $H_2O_2$ metering. The originally white silica gel assumes a yellowish color during time course of this time.

Degree of removal of nitrogen oxides: 95.6%.

Example 1

The equipment and the procedure in this Example correspond to that of Comparative Example 1, with the exception of the reactor design and time catalyst type. The hydrogen peroxide was contacted with the catalyst in vapor form. The catalyst is a zeolite (mordenite) which was shaped to form a honeycomb structure (weight of mordenite zeolite: 134 g; length: 190 mm; edge length: 45 mm; honeycomb dimensions: 5×5 mm; web thickness: 1 mm) and incorporated in a plastic tube. The gas mixture, a model gas, charged with $H_2O_2$ flowed through the channels in the honeycomb structure. The $NO_x$ concentration in time model gas was 260 ppm (200 ppm of NO, 60 ppm of $NO_2$), and the volume flow was 1 $Nm^3$/h. The nitrogen oxides were reacted at a temperature of 50° C. and at normal pressure.

An $NO_x$ concentration of 240 ppm of $NO_x$ (120 ppm of NO, 120 ppm of $NO_2$) was measured in the gas withdrawn. After the addition of 0.07 ml/min of 5% $H_2O_2$ solution, the $NO_x$ content of the gas withdrawn dropped to 45 ppm of $NO_x$ (32 ppm of NO, 13 ppm of $NO_2$) within 4 minutes.

Degree of removal of nitrogen oxides: 81.2%.

The use of the honeycombed structure for the catalyst has the advantage that there is a lower pressure drop across the reactor, as compared to the process using the solid catalysts.

Example 2

The procedure corresponded to Comparative Example 1 with the same catalyst, with hydrogen peroxide contacting the catalyst in vapor form, but the solvent used to absorb $HNO_3$ gas in the scrubbing column 10 was aqueous sodium nitrate solution with an $NaNO_3$ content of 400 g of $NaNO_3$/kg of solution.

The model gas had a concentration of 250 ppm of $NO_x$ (170 ppm of NO, 80 ppm of $NO_2$). The volume flow of the gas was 2.3 $Nm^3$/h. The scrubbing column was operated at a temperature of 60° C.

The $NO_x$ concentration in the gas withdrawn was 230 ppm (165 ppm of NO, 65 ppm of $NO_2$) without the addition of hydrogen peroxide, and 32 ppm of $NO_x$ (15 ppm of NO, 17 ppm of $NO_2$) with the addition of 0.04 ml/min of 50% $H_2O_2$ solution.

Degree of removal of nitrogen oxides: 87.2%.

It should be noted that the $HNO_3$ gas is indicated as $NO_x$ in time analyzer. If the main reaction product, $HNO_3$, present in gaseous form after the catalytic reaction is not substantially absorbed by $NaNO_3$ solution in the scrubber 10, this high degree of removal of nitrogen oxides is not obtained.

Example 3

Part (a)

The procedure was as in Comparative Example 1, except that the catalyst used was pyrogenic silica (Aerosil 200) which had been compressed to tablets having the dimensions of 6×5.5 min. The tablets were in a jacketed glass tube having an internal diameter of 30 min. The catalyst was present in a fixed bed.

The depth of the packing was 200 mm. The model gas used was 0.74% by volume (7400 ppm) of $NO_2$ in dry air. The temperature of the gas in the reactor was varied between 60° C. and −2.5° C. via a cooling circuit. Hydrogen peroxide was contacted with the catalyst in vapor form. The $H_2O_2$-charged model gas flowed through the reactor from the top so as to facilitate the drainage of condensing nitric acid into a downstream collecting vessel.

Operating conditions were as follows:
Flow of model gas: 1.6 $Nm^3$/h;
$NO_x$ content of crude gas 7400 ppm of $NO_x$ (5400 ppm of NO 2000 ppm of $NO_2$);
Catalyst: 44 g of Aerosil 200, 6×5.5 mm tablets;
Metering of 50% $H_2O_2$ solution, ml/min: 0.47 ml/min.

TABLE 1

| Reactor temperature °C. | 60 | 15 | 4 | −2 | −2.5 |
|---|---|---|---|---|---|
| Values for purified gas: | | | | | |
| $NO_x$, ppm | 450 | 620 | 740 | 900 | 1300 |
| NO, ppm | 60 | 100 | 150 | 220 | 450 |
| $NO_2$, ppm | 390 | 520 | 590 | 680 | 850 |
| Degree of removal of | 93.9 | 91.6 | 90 | 87.8 | 82.4 |

TABLE 1-continued nitrogen oxides, %

As nitric acid condensed out in the reactor together with water of reaction, the catalyst was perfused with condensate after some time. The efficacy of removal of nitrogen oxides was maintained even with the catalyst in this state.

It is clear from the measurement result for 60° C. that the conversion of the nitrogen oxides which has taken place is in excess of the stoichiometric conversion in terms of the equations. Instead of the 0.47 ml/min of 50% $H_2O_2$ solution which was in fact added, a greater amount, namely 0.587 ml/min, would theoretically have been required in order to achieve the result obtained.

Part (b)

The process was carried out as in part (a) of this Example, but without vaporization of the hydrogen peroxide solution into the stream of model gas. Instead, the hydrogen peroxide solution was introduced dropwise directly onto the catalyst tablets by means of a tube.

The following values got the purified gas in ppm were obtained at a reactor temperature of 60° C.:

| $NO_x$ | NO | $NO_2$ |
|---|---|---|
| 950 | 120 | 830 |

Example 4

The laboratory apparatus described in Comparative Example 1 was charged with flue gas from a household refuse incineration plant, withdrawn after the second flue gas scrubbing, instead of using model gas. The waste gas was at a temperature of 60° C. and was saturated with water vapor. The gas was pulled through the apparatus by means of a pump. The apparatus included an $H_2O_2$ vaporizer (temperature 80° C.), a reactor (glass column, diameter: 30 mm, length: 300 mm), a packed scrubber and a downstream gas pump. The catalyst used was amorphous silica (Aerosil 380) which had been compressed to 3×3 mm tablets. The gas path was heated up to tend of the catalyst packing (depth 220 mm), in order to prevent water from condensing out in the reactor.

The nitrogen oxide content was measured with an $NO_x$ analyzer (chemiluminescence principle). On entering the experimental apparatus, the flue gas originating from the refuse incineration plant had an $NO_x$ concentration of between 170 ppm and 200 ppm, about 95% of the $NO_x$ being in the form of NO.

The residual concentrations in time gas withdrawn from the apparatus varied according to the flow velocity through the one-stage fixed catalyst bed. The measurement results obtained are summarized in Table 2.

TABLE 2

Catalytic conversion of nitrogen oxides with $H_2O_2$ in the waste gas from a refuse incineration plant.

| Gas flow, Nm³/h | 0.55 | 0.55 | 1.33 | 1.33 | 0.80 |
|---|---|---|---|---|---|
| Metering of 50% $H_2O_2$ solution, ml/min | 0 | 0.05 | 0.05 | 0.1 | 0.1 |
| $NO_x$ content, ppm | 185* | 45 | 78 | 78 | 48 |
| NO content, ppm | 176* | — | — | — | 28 |
| $NO_2$ content, ppm | 9* | — | — | — | 20 |

Inlet gas: 170–200 ppm of $NO_x$ (95% of NO) saturated with water vapor at 60° C.;
Reactor temperature: 65° C.;
*average value
— not measured

Example 5

The apparatus used in this and the following Examples was a commercially available glass apparatus (internal diameter: 300 mm, height: 3000 mm) with inlet and outlet ports, three sieve plates for holding the catalyst and lateral ports above each sieve plate. This apparatus design is shown diagrammatically in FIG. 2. The gas flowed through the reactor $R_1$ from bottom to top for fluidized-bed operation, and in the opposite direction, i.e., from top to bottom, for fixed-bed operation. After the reaction, the gas was fed into a packed scrubber $W_1$ (diameter: 300 mm; depth of the packing: 1000 mm; packing: chips; solvent: water). The $NO_x$-containing gas was pulled through the plant via a downstream fan $S_1$.

Before entering the reactor $R_1$, the gas was heated with an electric preheater $H_1$. To reduce heat losses, the reactor $R_1$ was clad with insulating material on the outside. Before entering the reactor $R_1$ and after leaving the scrubber $W_1$, the $NO_x$ concentration in the gas was determined by the chemiluminescence principle in an $NO_x$/NO analyzer. The NO concentration could also be measured in this analyzer by switching the instrument over. The gas flow through the apparatus was determined via measurement of the gas velocity with an impeller probe $F_1$ in a measuring tube (length 2000 mm, diameter 150 mm), which was incorporated downstream from the packed scrubber $W_1$. The temperature of the gas was measured by means of thermocouples at the inlet and outlet ports of the reactor $R_1$ and at the outlet of the packed scrubber $W_1$.

The $H_2O_2$ was metered via two-fluid nozzles (working gas: air). One nozzle was arranged over each catalyst bed. The hydrogen peroxide solution was fed to each of the nozzles via an automatic metering device $D_1$, $D_2$ or $D_3$. The addition of $H_2O_2$ could be accurately adjusted in this way.

By shutting off the working air to the nozzles, the $H_2O_2$ solution could be introduced dropwise or trickled onto the catalyst without otherwise modifying the apparatus.

Surrounding air (at 20° C.), to which NO from a steel gas cylinder was added in the intake line of the reactor to a content of 245 ppm of $NO_x$ (230 ppm of NO, 15 ppm of $NO_2$), was pulled through this plant. The highest and lowest sieve plates were each charged with 700 g of catalyst (silica gel, average pore size: 60 μm; particle size: 0.2–0.5 mm). The gas flow through the plant was 100 m³/h (20° C., 1 bar). Under these conditions, a fluidized bed of the catalyst was formed at each level. The $H_2O_2$ solution was sprayed in between the two catalyst beds (the middle sieve plate had been removed for this series of experiments).

The experimental results, for which initially only the first sieve plate and then both sieve plates were charged with catalyst, are summarized in Table 3.

TABLE 3

Experimental results with NOₓ-containing air at 20° C., gas flow of 100 Nm³/h and 700 g of silica gel per level

| | Only first sieve plate | | Both sieve plates | | | |
|---|---|---|---|---|---|---|
| min/min of 50% H₂O₂ Values for purified gas: | 0 | 2 | 0 | 0.5 | 1 | 2 |
| NOₓ, ppm | 245 | 90 | 245 | 112 | 57 | 38 |
| NO, ppm | 230 | 30 | 230 | 53 | 34 | 18 |
| NO₂, ppm | 15 | 60 | 15 | 59 | 23 | 20 |

Example 6

The plant described in connection with Example 5 was now operated with flue gas (dew point 60° C.) from a refuse incineration plant, saturated with water vapor. Before entering the reactor, the gas was heated to approximately 90° C. in order to prevent water from condensing in the reactor. The lowest sieve plate of the reactor was charged with 2100 g of catalyst (silica gel 60). The 50% hydrogen peroxide solution was introduced dropwise at a metering rate of 5 ml/min into the fluidized bed formed, the metering orifice of a spray nozzle without an atomizer (one-fluid nozzle) remaining fixed in one location.

The volume flow of the flue gas was 55 Nm³/h, and the average temperature in the reactor was approximately 80° C. The nitrogen oxide content of the gas at the inlet varied around a value of 175 ppm (95% of NO).

The purified gas had a nitrogen oxide content of 56 ppm (38 ppm of NO, 18 ppm of NO₂). A degree of removal of nitrogen oxides of 68% was achieved.

Example 7

Figure 2:
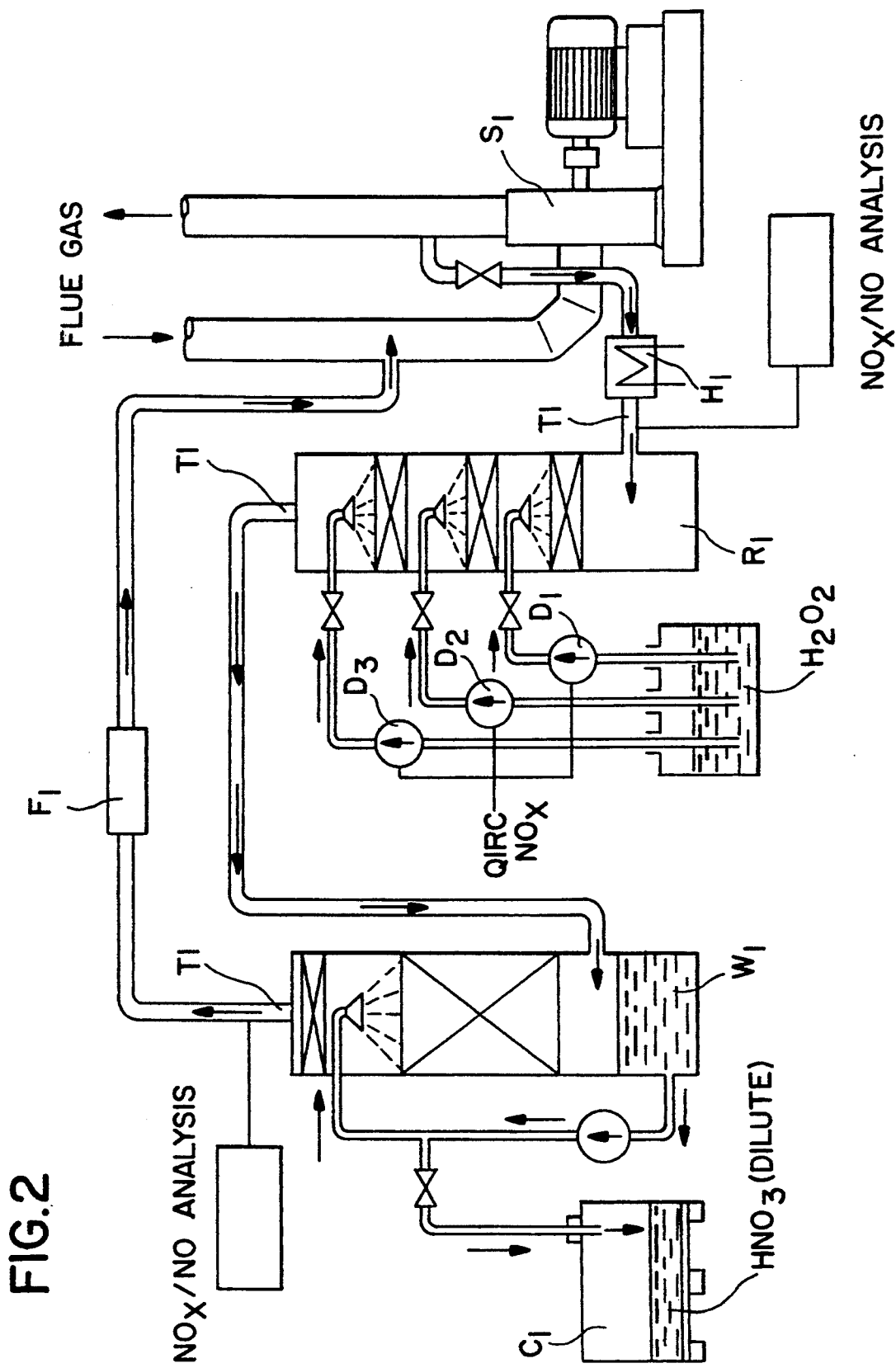
FIG. 2 is a flow diagram illustrating another method for carrying out the process in accordance with the invention.

The mode of operation corresponded to that of Example 6, except that all 3 sieve plates (levels) of the apparatus according to FIG. 2 were charged with catalyst, levels 1 and 2 each being operated with 2 kg or silica gel 60 (0.2–0.5 mm) as a fluidized bed, but level 3 being operated with 4 kg of DAY-zeolite (dealuminized y-zeolite, 2×3 mm extrudates) as a fixed bed. 5 ml/min of 50% H₂O₂ solution were introduced dropwise exclusively onto the agitated catalyst of level 1.

The volume glow of the glue gas was 50 Nm³/h and the average temperature in the reactor was approximately 80° C. The nitrogen oxide content of the gas at the inlet varied around 175 ppm.

The purified gas had a nitrogen oxide content of 15 ppm (4 ppm of NO, 11 ppm of NO₂).

A degree of removal of nitrogen oxides of 91% was achieved.

Example 8

The operation corresponded to that of Example 6, except that the reactor was equipped with only one sieve plate used to support a packed bed of 30 g of catalyst including a compacted pyrogenic silica (Aerosil 200, 6×5.5 mm tablets).

The flue gas flowed through the reactor from top to bottom. The hydrogen peroxide solution was sprayed upward in the reactor onto the catalyst packing, the 50% H₂O₂ solution being fed to the nozzle via an on-off control. The measuring signal from the NOₓ analyzer on the purified gas side served as the input signal for the on-off control. The output signal from the latter acted as a switching signal for the H₂O₂ metering pump. The output of the pump was set to 1 ml/min of 50% H₂O₂ solution.

The volume flow of the flue gas was 55 Nm³/h and the average temperature in the reactor was approximately 70° C. The nitrogen oxide content of the gas at the inlet varied erratically around 175 ppm (95% of NO). The triggering point of the on-off control was set at 75 ppm. The nitrogen oxide concentration in the purified gas varied uniformly between 50 ppm and 88 ppm.

Continuous metering of 1 ml/min of 50% H₂O₂ solution made it possible to achieve a nitrogen oxide concentration in the purified gas of 13 ppm of NOₓ (consisting exclusively of NO₂).

While the invention has been described in conjunction with various particular examples, these examples are intended only to be illustrative of the invention and not limiting the same. Those skilled in the art will recognize that various changes and modifications may be made without departing from the spirit and scope of the invention, as defined in the claims.

The priority document, German Patent Application P 41 36 183.0, filed in Germany on Nov. 2, 1991, is relied on and entirely incorporated herein by reference.

We claim:

1. A process for the oxidative purification of waste gas containing nitrogen oxides, comprising:
   determining a content of nitrogen oxides in the waste gas;
   reacting the waste gas with hydrogen peroxide in an amount appropriate to the content of nitrogen oxides to be removed and equal to at least half of a stoichiometrically sufficient amount needed to satisfy the reaction equations:

$$2NO + 3H_2O_2 \rightarrow 2HNO_3 + 2H_2O, \quad (I)$$

$$2NO_2 + H_2O_2 \rightarrow 2HNO_3, \quad (II)$$

or both reaction equations, wherein the reactions take place on a catalyst, which catalyst is adsorbent toward H₂O₂, NO, or NO₂, and is capable of catalyzing said reactions;
   withdrawing at least a portion of the reacted waste gas containing a gaseous HNO₃/H₂O mixture for further processing to nitric acid or to a nitrate solution,
   wherein the reaction step is carried out at a temperature which is at least sufficient to support the reactions and at a temperature below 180° C., and the hydrogen peroxide is brought into contact with the catalyst as a solution.

2. A process according to claim 1, wherein the reaction is carried out in a shaken bed, a fixed shaking bed, a filter candle, a whirl bed or on a honeycomb catalyst.

3. A process according to claim 1, wherein the catalyst is in the form of fine particles, granulates, tablets, honeycomb, or applied on a honeycomb formed carrier, wherein the catalyst composition is at least one of the materials selected from the group consisting of:
   silica, precipitated silica, pyrogenic silica, optionally in a hydrophobic form;
   natural or synthetic zeolites having large-sized pores or medium-sized pores;
   ion exchange resins with a porous structure;
   phyllosilicates;
   diatomaceous earth;

aluminum oxide;
titanium dioxide;
natural or synthetic layer silicates; and
activated charcoal, whereby the catalyst does not excessively decompose hydrogen peroxide.

4. A process according to claim 1, further comprising: introducing the hydrogen peroxide solution into the waste gas stream by spraying or atomizing to thereby form a mixture, and applying the mixture onto the catalyst.

5. A process according to claim 1, wherein the hydrogen peroxide solution is applied to the catalyst by directly pouring, by adding hydrogen peroxide dropwise, or by spraying hydrogen peroxide solution onto the catalyst.

6. A process according to claim 1, wherein when the hydrogen peroxide is initially introduced, the catalyst is either in a dry state or under condensation from water contained in the waste gas.

7. A process according to claim 1, further comprising: removing the $HNO_3$ from the waste gas by absorption or condensation, and reacting the waste gas again, by contacting it with the catalyst for a further reduction of any nitrogen oxides still present, and, optionally, adding additional $H_2O_2$.

8. A process according to claim 1, further comprising: reducing a proportion of $HNO_3$ present in the gaseous phase in the reacted waste gas, by condensation or by scrubbing with a scrubbing solution selected from the group consisting of: water, dilute nitric acid, an alkali metal nitrate solution or an alkaline earth metal nitrate solution.

9. A process according to claim 8, wherein the reducing step is a scrubbing operation, and further comprising: recycling the scrubbing solution for concentrating the nitric acid or the nitrate content, optionally adding an alkali metal hydroxide or an alkaline earth metal hydroxide solution, and drawing off concentrated nitric acid or nitrate solution.

10. A process according to claim 1, wherein the determining step includes ascertaining the amount of hydrogen peroxide solution to be used based on the nitrogen oxide concentration in the crude gas, the nitrogen oxide content of the reacted waste gas, or both nitrogen oxide contents, or a difference between the nitrogen oxide contents.

11. A process according to claim 1, wherein the temperature is in the range of 20° to 100° C.

12. A process according to claim 1, wherein the hydrogen peroxide solution has a hydrogen peroxide content of up to 85% by weight.

13. A process according to claim 1, further comprising: reducing a proportion of $HNO_3$ in the reacted waste gas by condensation or by scrubbing with a nitrate salt scrubbing solution, wherein the nitrate salt solution is an alkali metal nitrate solution or an alkaline earth metal nitrate solution.

14. A process according to claim 13, wherein the nitrate salt solution is sodium nitrate.

15. A process according to claim 1, wherein the catalyst is present in a reactor in three separate trays, wherein, optionally, each tray has a different catalyst composition therein.

16. A process according to claim 1, wherein the catalyst is present in a reactor in two separate trays, wherein, optionally, each tray has a different catalyst composition therein.

17. A process according to claim 1, wherein the catalyst is present in the reactor in a single tray.

18. A process according to claim 1, further comprising: recovering nitric acid or nitrate solution from the portion of the waste gas withdrawn after reacting.

19. A process according to claim 1, further comprising scrubbing the $HNO_3$ present in the gaseous $HNO_3$/$H_2O$ mixture after the reacting step with an alkali metal nitrate scrubbing solution or an alkaline earth metal nitrate scrubbing solution.

20. A process according to claim 10, wherein the pH of the scrubbing solution is below 7.

* * * * *

UNITED STATES PATENT AND TRADEMARK OFFICE
CERTIFICATE OF CORRECTION

PATENT NO. : 5,366,711
DATED : November 22, 1994
INVENTOR(S) : Wedigo von Wedel et al.

It is certified that error appears in the above-indentified patent and that said Letters Patent is hereby corrected as shown below:

On the cover page of the patent, in field code "[75] Inventors:", please change "Wegido von Wedel" to --Wedigo von Wedel--.

Signed and Sealed this

First Day of August, 1995

*Attest:*

BRUCE LEHMAN

*Attesting Officer*     *Commissioner of Patents and Trademarks*